United States Patent
Phan Le (10) Patent No.: US 8,558,162 B2
(45) Date of Patent: Oct. 15, 2013

(54) OPTICAL POINTING DEVICE HAVING A TRANSPARENT HOUSING ELEMENT

(75) Inventor: Kim Phan Le, Eindhoven (NL)

(73) Assignee: NXP B.V., Eindhoven (NL)

(*) Notice: Subject to any disclaimer, the term of this patent is extended or adjusted under 35 U.S.C. 154(b) by 340 days.

(21) Appl. No.: 12/936,627

(22) PCT Filed: Apr. 8, 2009

(86) PCT No.: PCT/IB2009/051485
§ 371 (c)(1),
(2), (4) Date: Oct. 6, 2010

(87) PCT Pub. No.: WO2009/125360
PCT Pub. Date: Oct. 15, 2009

(65) Prior Publication Data
US 2011/0031380 A1 Feb. 10, 2011

(30) Foreign Application Priority Data
Apr. 8, 2008 (EP) .................................. 08103437

(51) Int. Cl.
*G06M 7/00* (2006.01)
*G06F 3/033* (2013.01)

(52) U.S. Cl.
USPC ........................................ 250/221; 345/161

(58) Field of Classification Search
USPC ............................ 250/221; 345/156, 161, 166
See application file for complete search history.

(56) References Cited

U.S. PATENT DOCUMENTS

| | | | |
|---|---|---|---|
| 5,811,797 A * | 9/1998 | Kobachi et al. | 250/239 |
| 5,943,233 A | 8/1999 | Ebina et al. | |
| 6,326,948 B1 | 12/2001 | Kobachi et al. | |
| 2006/0158424 A1 | 7/2006 | Xie | |
| 2009/0073119 A1 | 3/2009 | Phan Le | |
| 2009/0101802 A1 | 4/2009 | Phan Le | |
| 2009/0101803 A1 | 4/2009 | Phan Le | |
| 2009/0194532 A1 * | 8/2009 | Yang et al. | 220/211 |
| 2009/0231165 A1 | 9/2009 | Phan Le | |

OTHER PUBLICATIONS

International Search Report and Written Opinion for Application PCT/IB2009/051485, 2009.

* cited by examiner

*Primary Examiner* — Thanh Luu (57) ABSTRACT

The optical pointing device of the present invention comprises a base and an actuator movable connected to the base, wherein the actuator comprises a reflective portion on a side facing the base, and wherein the base comprises a light source for emitting light towards the reflective portion of the actuator, a detector comprising one of more detection units for detecting at least a part of the light reflected by the reflective portion of the actuator, and a transparent element arranged between the actuator and at least one of the light source and the detection units, for providing a closed transparent housing for the light source and/or the detection units.

20 Claims, 7 Drawing Sheets

OPTICAL POINTING DEVICE HAVING A TRANSPARENT HOUSING ELEMENT

FIELD OF THE INVENTION

The invention relates to an optical pointing device comprising a base and an actuator movable connected to the base. Examples of such pointing devices are joysticks and multi functional keys, which are used in for example consumer products, such as mobile phones, personal computers, personal digital assistant and remote controls, and non-consumer products, without excluding further examples.

BACKGROUND OF THE INVENTION

A prior art input device is known from U.S. Pat. No. 6,326,948. This document discloses an input device comprising a base with a slide surface, a movable body slidable on the slide surface, a light-emitting element for emitting light, a reflective portion which is provided for the movable body and has a reflective surface for reflecting the light emitted by the light-emitting element, and a plurality of light-receiving elements for receiving the light reflected by the reflective portion.

In the prior art input device the movable body and its connection to the base are formed by an insert moulding technique or the like in order to realize a hermetic structure under the surface of the movable body. In this way a substantially dustproof construction can be realized.

It is an object of the invention, inter alia, to provide an optical pointing device having an improved environment resistance.

SUMMARY OF THE INVENTION

According to a first aspect, the invention provides an optical pointing device comprising a base and an actuator movable connected to the base, wherein the actuator comprises a reflective portion on a side facing the base, and wherein the base comprises:

a light source for emitting light towards the reflective portion of the actuator, a detector comprising one or more detection units for detecting at least a part of the light reflected by the reflective portion of the actuator, and a transparent element arranged between the actuator and the light source and/or the detection units for providing a closed transparent housing for the light source and/or the detection units.

The base of the optical pointing device of the invention is provided with the transparent element so as to realize a hermetic closure for the light source and/or the detection units. Thus the light source and/or the detection units of the base are well protected from the environment, in particular from moisture and dust.

The base according to the invention is provided with a closed transparent housing, which makes the handling of the components during assembly much easier. It is noted that the dustproof construction of the prior art and thus any environment resistance, is obtained only after assembly of the input device.

Furthermore, the dustproof construction of the prior art is arranged between the movable body and its connection to the base, and has to cope with the relative movement of the movable body with respect to the base. The base according to the invention also provides environmental protection when the connection between the base and the actuator is not or no longer hermetic.

The detector is provided with one or more detection units. The device comprises a detector which on the one hand is able to determine the intensity of the reflected beam, and on the other hand is able to establish the position of the reflected beam.

Suitably, the detector comprises a plurality of detection units. In a first embodiment, the device comprises a detector based on a digital detection principle. In said first embodiment, series of detection units are present in a first direction and a second direction, preferably said first direction extends substantially perpendicular to said second direction. In a second embodiment, the detector is based on an analog detection principle. In said second embodiment a single detection unit per direction (i.e. at least two) is principally sufficient.

In one embodiment, the transparent element comprises a transparent material, wherein the light source and/or the detection units are moulded in the transparent material. For this embodiment the light source and/or the detection units are moulded in a transparent compound material, which material provides the transparent element, in particular after the material is cured. The transparent material can be a silicone material or any transparent plastic.

Advantages of using such a transparent package include low cost and better protection against moisture and dust. Moreover, any electronics of the optical pointing device, in particular any detection circuits and/or control circuits can also be arranged inside this package.

In one embodiment, a surface of the transparent material between the actuator and the light source and/or the detection units, is substantially flat.

The use of the transparent element or package may give rise to an additional reflection of the light from the light source. Since the transparent element or package is part of the base, and in particular is not movable with the actuator, it may provide a substantially constant background irradiance distribution or profile over the detection units. In one embodiment, the optical pointing device further comprising means to prevent or compensate for the detection of a background light not originating from said actuator, in particular originating from a part of said base, in particular from the transparent element.

The inventor realized that this background may become substantial, when the background light comprises total reflected light from the transparent element, in particular total internal reflected light from the transparent element.

In one embodiment, the detection units are placed in an area substantially outside a zone illuminated by the background light, in particular the zone illuminated by the totally reflected light, which can be determined using geometric optics, depending, inter alia, on the positions of the light source and the transparent element or package. When designing an optical pointing device according to the invention, the detection units are placed outside this zone.

In one embodiment, the sensitivity and/or threshold of the detection units is arranged to be substantially proportional to an irradiance profile of the background light. For example, this irradiance profile of the background light can be determined by measuring the reflected light when the actuator with reflective portion is not in place.

In one embodiment, the optical pointing device further comprising a detections circuit, wherein said detection circuit is arranged to provide a different threshold for different detection units to compensate for the background light. The threshold of the detection circuit for the different detection units is substantially proportional to the irradiance profile caused by the background light. This embodiment provides an electronic compensation for the background light.

In one embodiment, the different detection units are provided with different photosensitive areas. Because the photocurrent (that is the signal) from the detection units scales with the area, the area (e.g. with fixed width and varied length) can be used to control the photocurrent of each detection unit. For instance the higher threshold needed for the detection units located at the peak of the total reflection profile can be brought down to the same level as the detection units located outside the peaks by setting their areas smaller correspondingly.

In one embodiment, the photosensitive area of a first detection unit arranged at a first location with a high background irradiance is smaller than the photosensitive area of a second detection unit arranged at a second location with less background irradiance. In one embodiment, the photosensitive areas of the first and second detection unit are arranged to provide substantially the same threshold for the first and second detection unit. However, since the sensitivity to the usable signal (that is the changing signal coming from the reflective portion of the actuator which is added to the constant background signal coming from the total reflection) may also drop. In this case the threshold detection circuit should be designed so that it is still sensitive enough to resolve the usable signal.

In one embodiment, the light source and/or the base comprises means for limiting the angular distribution of the emitted light substantially within an angle for total reflection at the transparent element, in particular a critical angle for total internal reflected light from the transparent element. For example, the base may be provided with a baffle to limit the angular distribution of the emitted light.

According to a second aspect, the invention provides an optical pointing device comprising a base and an actuator movable connected to the base, wherein the actuator comprises a reflective portion on a side facing the base, and wherein the base comprises:

a light source for emitting light towards the reflective portion of the actuator, a detector comprising one or more detection units for detecting at least a part of the light reflected by the reflective portion of the actuator, a transparent element arranged between the actuator and the light source and/or the detection units, and means to prevent or compensate for the detection of a substantially constant background light originating from the transparent element.

The inventor realized that a corresponding problem also arises when any transparent element, for example an optical element such as a lens and/or optical filter, is placed between the actuator and the light source and/or the detection units. Any background light originating from any of these transparent elements can also be prevented or compensated by the measures discloses above in relation with the closed transparent housing or packaging.

According to a third aspect, the invention provides an pointing device comprising a base and an actuator movable connected to the base, which base comprises:

a light source for illuminating the actuator, a detector comprising detection units for detecting light reflected by the actuator, wherein the detector is arranged to prevent or compensate for the detection of a substantially constant background light originating from a non-movable constituent of the pointing device.

The inventor realized that a corresponding problem also arises when any reflective element is placed between or around the actuator and the light source and/or the detection units. Any background light originating from any of these reflective elements can also be prevented or compensated by the measures discloses above in relation with the closed transparent housing or packaging.

According to a fourth aspect, the invention provides a product, such as a consumer or non-consumer product, comprising an optical pointing device as described above, in particular for providing a man-machine-interface that comprises the actuator.

In one embodiment, the product comprises a display, which display is an integrated display comprising at least the base of the optical pointing device as described above. This way the light source and detection units may be integrated with the electronics of the display and packaged together with said display electronics, which makes a production easier and less costly. The actuator may be provided on the outside of said display, for example located on a margin of the display area of the integrated display.

According to a fifth aspect, the invention provides a base unit for an optical pointing device as described above, wherein said base unit comprises:

a light source for emitting light, a detector comprising one or more detection units, which are placed juxtaposed to said light source, and wherein said light source is arranged to direct said emitted light in a direction away from said detection units, and a transparent element for providing a closed transparent housing for the light source and/or the detection units.

In one embodiment, the detector is arranged to prevent or compensate for the detection of a substantially constant background light originating from said transparent element. On the one hand this background light may originate from scattered light from said transparent element, on the other hand it may originate from back reflected light.

According to a sixth aspect, the invention provides a method of calibration of the base unit or the optical pointing device as described above, wherein said method comprises the steps of:

emitting light from said light source, and prevent that said light is reflected by said reflective portion of said actuator, for example when the reflective portion is not in place or by placing a non-reflective element in front of said reflective portion, readout said detector to determine the irradiance of the detection units due to the background light.

According to a seventh aspect, the invention provides a use of the optical pointing device as described above for sensing a pointing action indicated by a user, wherein said use comprises the steps of:

emitting light towards the reflective portion of the actuator, detecting at least part of the light reflected by the reflective portion of the actuator, and processing said detection light to sense the pointing action.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF EMBODIMENTS

Figure 1:
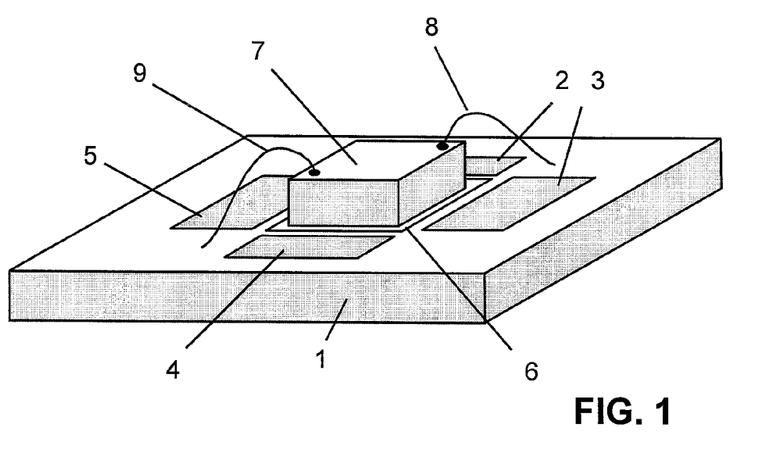
FIG. 1 shows diagrammatically a construction of a silicon die.
Figure 5:
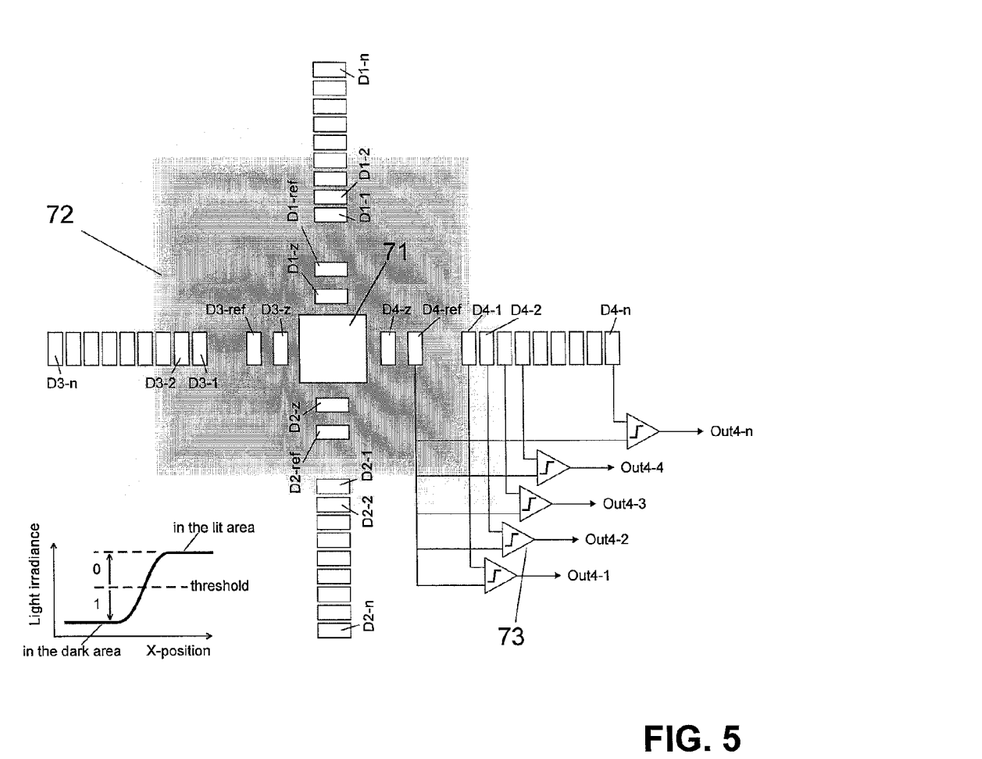
FIG. 5 shows diagrammatically a discrete detection method with electronic compensation.

The heart of the device according to a first exemplary embodiment as shown in FIG. 1, is a Si die 1 measuring about 2×2 mm² or smaller. On this die 1 there are 4 photodiodes 2, 3, 4, 5 in case of the analog detection method, or arrays of small photodiodes, as shown in FIG. 5 and describe in more detail below, in case of the discrete detection method. In the middle of the die 1 there is a large metal die pad 6 made from the top interconnect metal layer, on which a bare LED die 7 is mounted.

The LED die 7 can be connected to the Si substrate die 1 by one bond wire 8 for top-bottom contact LEDs, or two bond wires 8, 9 for top-top contact LEDs. In case the LED 7 has top-bottom contact, the substrate of the LED 7 is an electrode itself therefore the LED die 7 must be glued on the die pad 6 using a conducting glue.

The photodiodes 2, 3, 4, 5 are just normal CMOS diodes or specially optimized CMOS diodes for use in imaging applications. The area on top of the diodes 2, 3, 4, 5 must be open for the access of light. The CMOS technology must be chosen so that the depletion region is as thick as possible. For instance, CMOS 14 or CMOS 18 can be good candidates.

The rest of the die 1 can be used for the ASIC electronics. Electronics can also be built under the large die pad 6 of the LED 7 to save Si area.

If the geometry of the photodiodes 2, 3, 4, 5 needs to be longer than the width of the Si die 1, the whole photodiode configuration can also be located at 45 degrees with respect to the edges of the Si die 1. A detection circuit or software in a microprocessor for analyzing the signals from the photodiodes may transform the signal back to the 0 degree position, if required.

Figure 2:
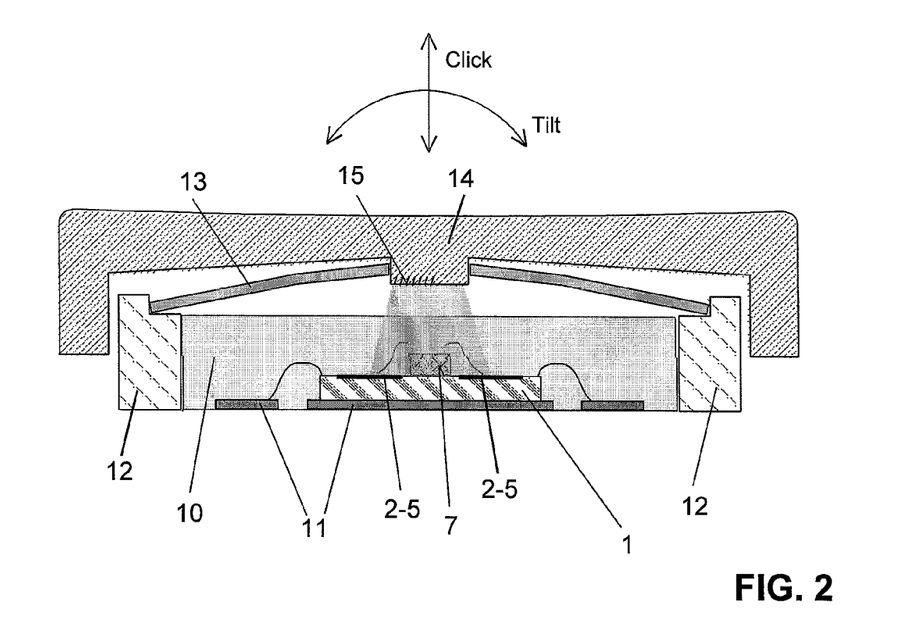
FIG. 2 shows an example of a optical pointing device according to the invention.

The Si die 1 as mentioned above is housed inside a close transparent package 10, as shown in FIG. 2.

In a production process, first of all a Si die array containing multiple of separate dies 1 arranged in an array, is mounted on a lead-frame 11. After gluing the LED dies 7 on the Si dies 1 using for example the pick-and-place process and making wire bonding for both the contacts from the LED 7 to the Si die 1 and from the Si die 1 to the lead frame 11. The die array is moulded in a transparent compound material. After the material is cured, the moulded structure is sawn into individual transparent packages having contact pads under the lead-frame 11. The transparent material (clear compound) can be a silicone material or any transparent plastic.

Advantages of using the transparent package 10 in this application include lower cost and better protection of the electronics. The transparent package 10 is closed to the environment and therefore the dies 1, 7 inside are well protected from moisture and dust. However light still can go through the transparent package 10 to reflect on the mirror 15 and come back to the photodiodes 2-5.

In a separate fabrication process, a square hard frame 12 that carries a dome-shaped spring 13 is made. The frame 12 is then assembled with the package 10, possibly using glue. In the last step, a control knob or actuator 14 having a mirror surface 15 at the bottom is attached to the spring 13. The spring 13 allows the actuator 14 and the mirror 15 to tilt a few degrees around the rest position shown in FIG. 2, and to click and release in the vertical direction. All forces from the user's finger, via the actuator 14, the spring 13 and the frame 12 should be totally transferred to the Printed Circuit Board (not shown) on which the device is soldered. With this construction the transparent package 10 and the dies 1, 7 inside are well protected from excessive external forces.

The use of the transparent package 10 gives rise to the total internal reflection pattern which may be a problem for the signal. The total internal reflection phenomenon will be explained in the following with reference to FIG. 3. When light coming from a medium of higher refraction index $n_1$, in this case the transparent package, to a medium of lower refraction index $n_2$, in this case the air on top of the package, it will be totally reflected at the interface when the angle of incidence is larger than the critical angle $\theta_{crit}$. The critical angle can be defined as $$\sin(\theta_{crit}) = n_2/n_1$$

Figure 3:
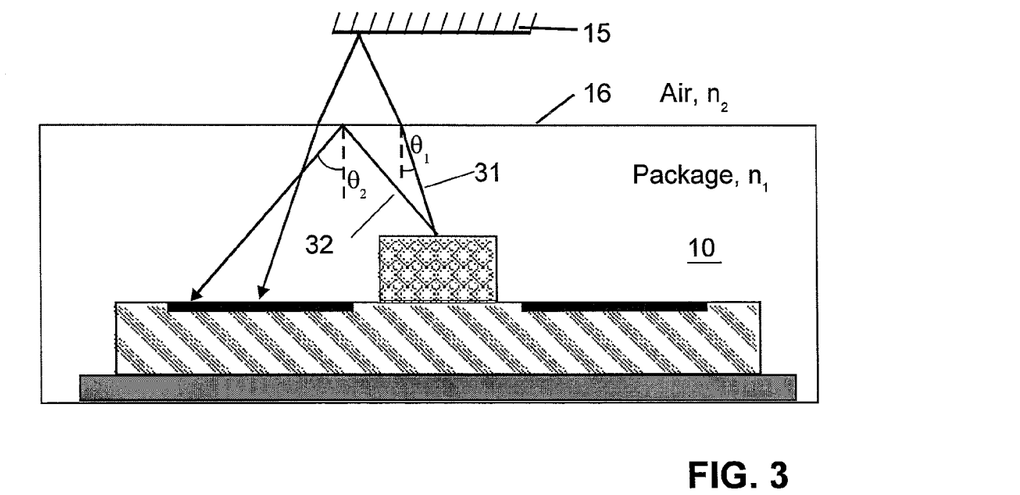
FIG. 3 diagrammatically illustrates the total reflection at the package interface.

For instance, if the transparent package has a refraction index $n_1$ of 1.42, the critical angle can be found at approximately 45 degrees. Beyond this critical angle the interface will act almost as a perfect mirror; all light beams are totally reflected.

In FIG. 3, light beam 31 arrives at the package interface 16 at an angle of $\theta_1 < \theta_{crit}$ thus it can go through, get reflected at the mirror 15 and go back to the package 10. Light beam 2 arrives at the package interface 16 at an angle $\theta_2 > \theta_{crit}$. It satisfies the total internal reflection hence is totally reflected at the interface 16 as if there is a mirror located at that position.

Figure 4:
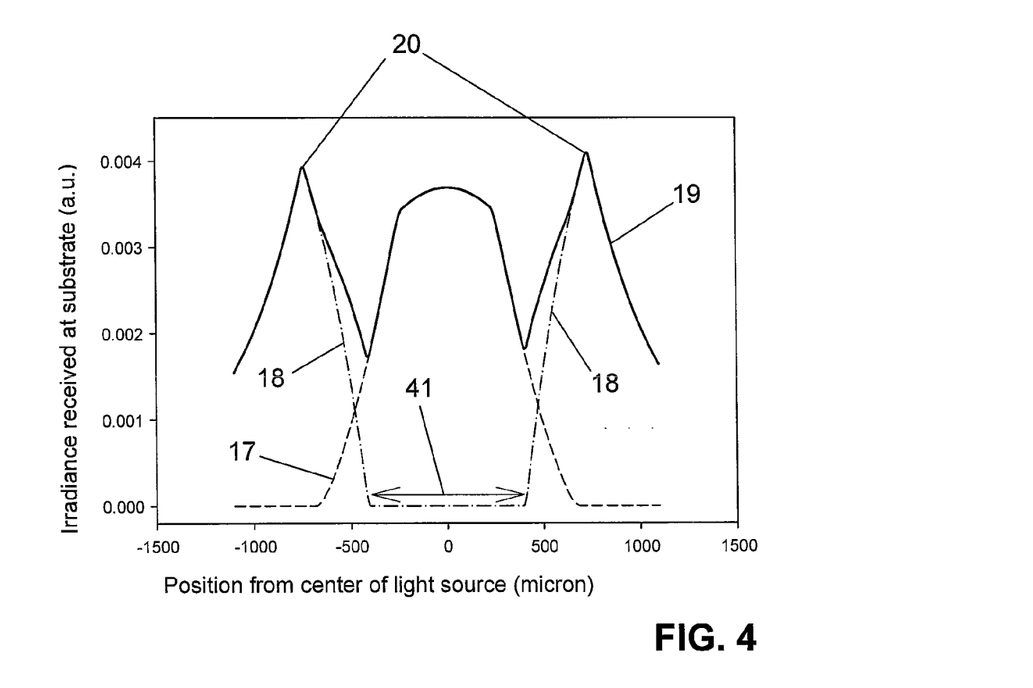
FIG. 4 shows diagrammatically an irradiance profile due to a reflection from the reflective portion of the actuator and from the package.

The light irradiance received at the photodiodes 2-5 is thus the total irradiance coming from the reflection at the mirror 15 and the total internal reflection from the package interface 16. A calculation has been made for a device having realistic dimensions. In FIG. 4, the irradiance profile received at the Si substrate, along a line that crosses the center of the light source, is presented. The graph shows three different curves: the first curve 17 is the irradiance profile of light reflected by the mirror 15; the second curve 18 represents the irradiance as a result of the total internal reflection at the package interface 16 and the third curve 19 shows the total irradiance received at the substrate. FIG. 4 clearly shows that the total internal reflection causes two symmetric peaks 20 at the outer areas of the substrate and the irradiance of those peaks is even higher than that of the reflection profile 17 from the mirror 15.

Fortunately the total internal reflection pattern 18 is not changed with the tilting angle of the mirror 15. For an analog detection method, when using a differential mode to obtain the signal of the sensor, the constant background due to the total reflection can be substantially eliminated.

However for a discrete detection method, the total reflection pattern may give a problem, which will be described in the following. In FIG. 5, an example of a discrete detection principle is shown. In short, the four photodiodes 2-5 are divided into many small "pixels". In this example, it is supposed that the light spot contains only the reflection pattern of the mirror 15. Four groups of small pixels are arranged around a middle light source 71. Within each group, besides the normal pixels $D_{m-1} \ldots D_{m-n}$ (where m=1-4) there is a special pixel which is used for detecting the click ($D_{m-z}$) and a reference pixel ($D_{m-ref}$) which is used as the reference for the threshold detection. These two special pixels are always located inside the light spot 72. A plurality of threshold detection circuits 73 compare the signal coming from the pixels $D_{m-1} \ldots D_{m-n}$ to that of the reference pixel ($D_{m-ref}$). Each pixel is connected to a simple threshold detection circuit 73. This circuit converts the analog signal of the pixel into a digital signal: for example, if the signal at the pixel is above a certain threshold the output of the circuit returns a "0", otherwise it returns a "1". The total signal received by each of the 4 groups of pixels is obtained by counting the number of 1s and 0s using a counting circuit.

When the sensor substrate is encapsulated inside a transparent package 10, the total internal reflection will result in much higher background signal at pixels located close to the total internal reflection peaks 20 as shown in FIG. 4. If the threshold value is set the same for all the pixels, the pixels located close to the total reflection peaks 20 may always return a "0" (meaning at light) regardless the signal coming form the mirror.

There are several solutions for this problem:

In a first exemplary embodiment the pixels are placed within the area where the total internal reflection does not occur. In the situation of FIG. 4, for instance, the pixels must be placed in the area 41 from −400 μm to +400 μm, corresponding to the region free of total reflection.

In a second exemplary embodiment the threshold is set differently for different pixels by the circuit design, to compensate for the change of the background irradiance due to the total reflection. Essentially the setup as shown in FIG. 5 can be used. However the simple threshold detection circuit 73 must be adapted in order to obtain for each pixel a threshold that is substantially proportional to the irradiance profile 18 of FIG. 4, caused by the total internal reflection.

Figure 6:
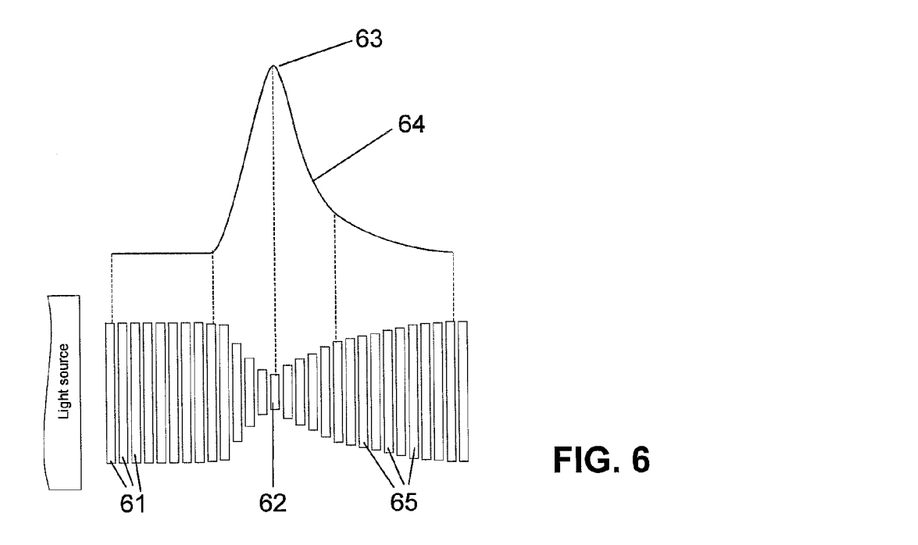
FIG. 6 shows diagrammatically a discrete detection method with tuned photosensitive areas.

In a third exemplary embodiment, the areas of the pixels 61 are tuned so that the threshold value can be a constant for all pixels 61. This case is illustrated in FIG. 6. Because the photocurrent from the pixels scales with area, the photosensitive area of the pixels, for example with fixed width and varied length, can be used to control the photocurrent of each pixel 61. For instance the higher threshold needed for the pixels 62 located at the peak 63 of the total reflection profile 64 can be brought down to the same level as the pixels 61, 65 located outside the peaks by setting their areas smaller correspondingly.

Figure 7:
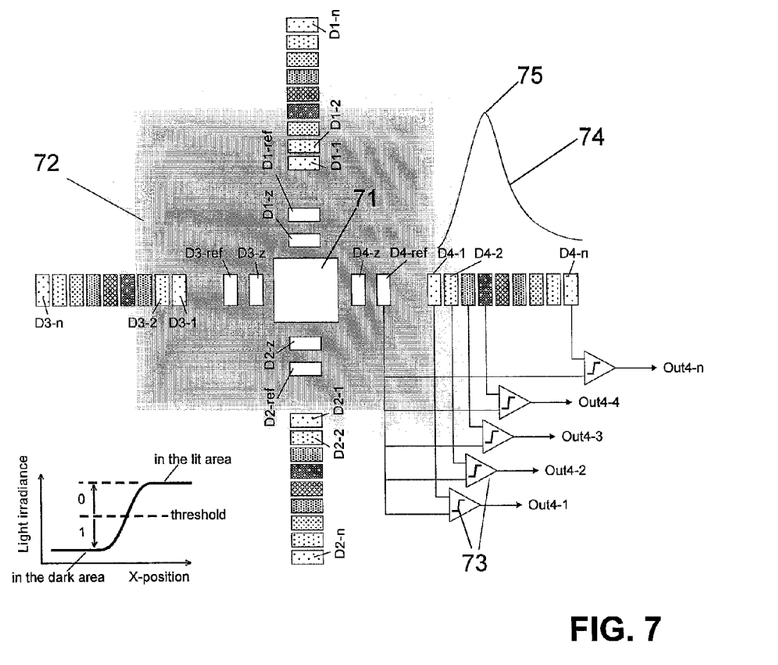
FIG. 7 shows diagrammatically a discrete detection method with photosensitive areas comprising an optical filter.

In a fourth exemplary embodiment, the threshold value of the pixels may be the same for all pixels. However the reflected light is filtered by an optical attenuation filter(s) on top of said pixels, wherein the optical density or transmission coefficient of said filter is used to control the photocurrent of each pixel, as shown in FIG. 7. For instance the higher threshold needed for the pixels located at the peak 75 of the total reflection profile 74 can be brought down to the same level as the pixels located outside the peaks by providing these pixels with an optical filter with a lower transmission coefficient.

Figure 8:
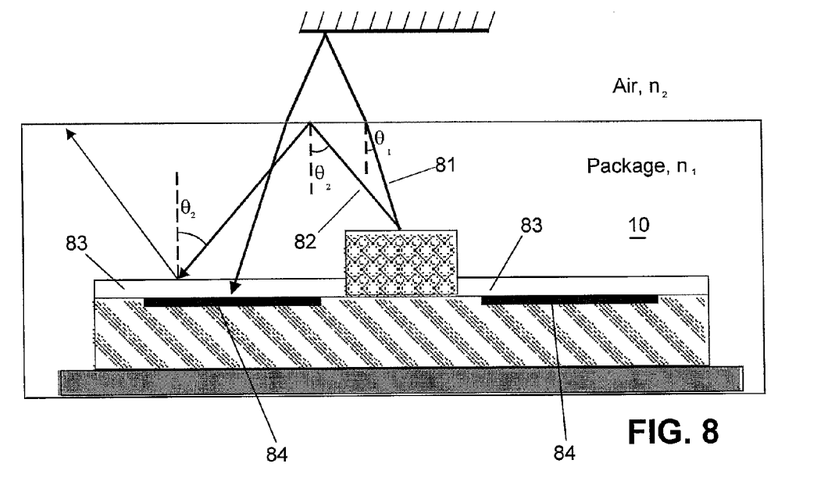
FIG. 8 diagrammatically illustrates the effect of an air gap above the photosensitive areas.

In a fifth exemplary embodiment, the problem of total internal reflection on the interface 16 is solved by introducing an air gap 83 above the photosensitive areas 84. In the example as shown in FIG. 8, the air gap 83 provides a further interface 17 which is substantially parallel to the interface 16. If a light-beam 82 satisfies the total internal reflection at the package interface 16 and is totally reflected, it also satisfies this condition at the air gap interface 17 and is again totally reflected, without reaching the photosensitive areas 84. In this case the package 10 may function as a planar waveguide for transporting the totally reflected light away from the photosensitive areas.

Figure 9:
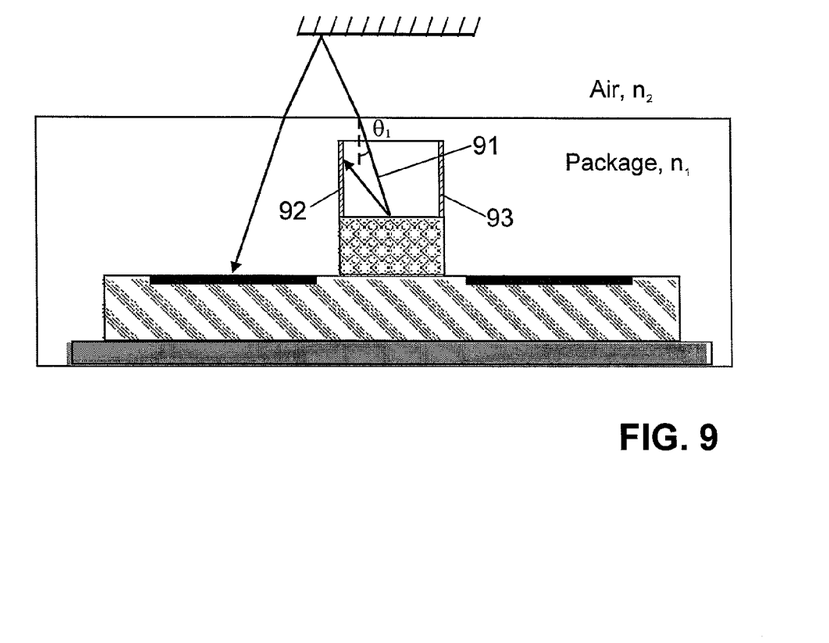
FIG. 9 shows diagrammatically a construction using a baffle.

In a sixth exemplary embodiment, as shown FIG. 9, a baffle 93 is placed on top of the light source for limiting the angular distribution of the emitted light substantially within an angle for total reflection at the package interface 16.

The total internal reflection problem can be reduced or even substantially eliminated using a anti-reflection coating on top of said transparent packaging. In one embodiment, said anti-reflection coating comprises a series of transparent layers, for example dielectric layers, on top of each other.

Figure 10:
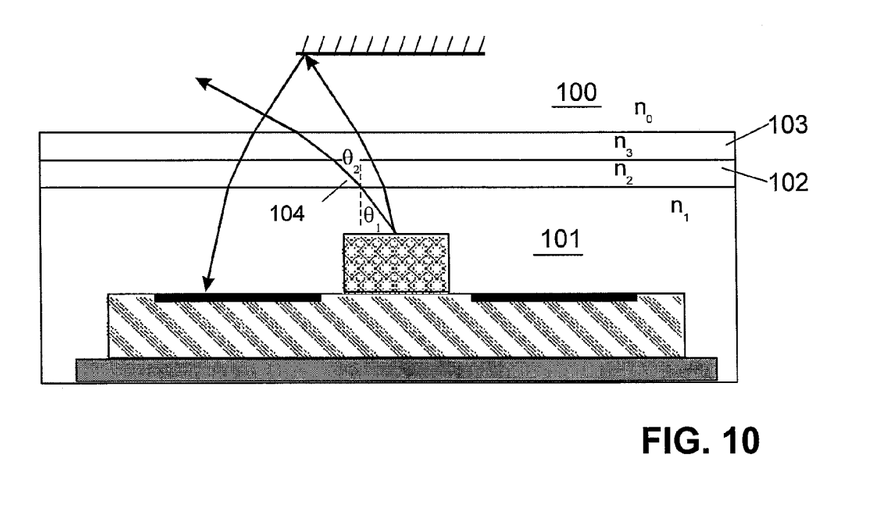
FIG. 10 shows diagrammatically an embodiment where said transparent package is provided with an anti-reflection coating.

In the seventh exemplary embodiment, as shown in FIG. 10, the total internal reflection can be substantially eliminated using the refraction index matching method. Suppose that the package 101 has the refraction index of $n_1$, which is considerable higher than $n_0$ of air 100, that would cause the total internal reflection to happen at a relatively low critical angle if the package 101 is directly interfacing with air 100. In the exemplary embodiment of FIG. 10, a number of transparent layers 102, 103 with different refraction indices $n_2, n_3, \ldots, n_m$ are placed in between the package material 101 and air 100. The order of the layers 102, 103 and the refraction indices are arranged such that $n_1 > n_2 > n_3 > \ldots > n_m > n_0$. By this way the critical angle of a light beam going from a layer of $n_i$ to the next layer of $n_{i+1}$ can be higher. Thus the total internal reflection can substantially be avoided. In FIG. 10, only two layers 102, 103 are shown as an example. When a light beam 104 goes from the package 101 with refraction index $n_1$ to the first layer 102 with refraction index $n_2$, the critical angle can be higher since the ratio $n_2/n_1$ is larger than the ratio $n_0/n_1$. At the interface between the top layer 103 with refraction index $n_3$ and air 100, similarly, the critical angle is higher because $n_0/n_3$ is lager than $n_0/n_1$. Therefore, the beam 104 which would be totally internal reflected in a system without refraction index matching, will now pass without being totally reflected.

Figure 11:
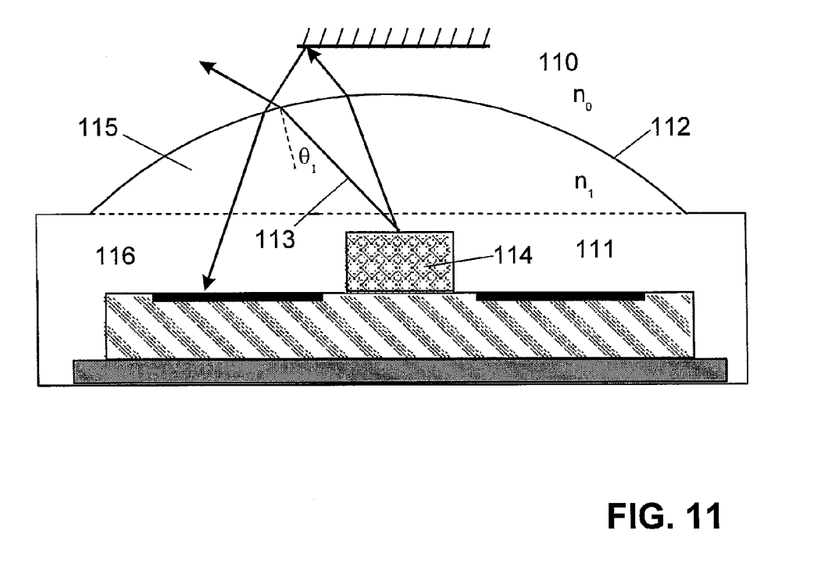
FIG. 11 shows diagrammatically a construction where the surface of the transparent package is curved.

In an eight exemplary embodiment, as shown in FIG. 11, the total internal reflection problem can be overcome by providing the top surface 112 of the package 111 with a curved form, such that the angle of incident of a light beam 113 from the source 114 at the boundary 112 between the package 111 and air 110, is reduced. For example the top surface 112 of the package 111 may be moulded in a curved, dome-shaped form, such that the angle of incident of any beam, or the majority of beams, originating from the source 114 and going towards the interface 112 is smaller than the critical angle. In the example in FIG. 11, the top surface 112 of the package 111 has a convex spherical shape. The light beam 113 arrives at the surface 112 with the incident angel $\theta_1 < \theta_{critical}$. Therefore a total internal reflection does not occur. Any other form of the top surface 112, rather than spherical that satisfies the above condition is possible. Furthermore, in stead of moulding a curved top surface, a transparent element 115 having a curved top surface may be attached on top of a standard moulded flat top surface 116. In one embodiment said transparent element 115 has substantially the same refractive index as the package 111 material.

In one embodiment said transparent element 115 is glued on top of the package 111 material, preferably using a gluing material with a matching refractive index.

Figure 12:
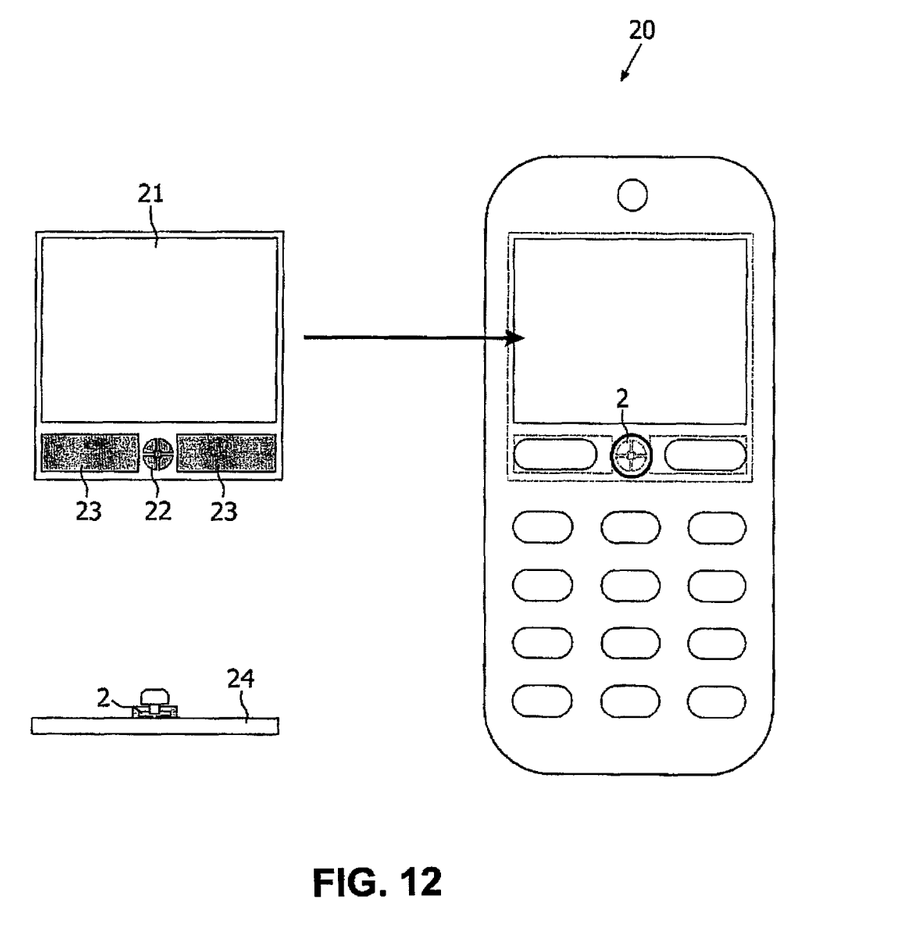
FIG. 12 shows a product according to the invention.

FIG. 12 shows an example of a product 20 according to the invention. It comprises a display 21 and an actuator 22 such as a joystick. The joystick is for example mounted on a joystick area 25 of the display area that comprises the detection circuit and the light source between integrated electronics areas 23, which form part of a display substrate 24. The display 21, the electronics 23, detection circuit and the light source are housed inside the same transparent package. The actuator 22 is hung above this package.

The optical joystick is based on the active-matrix OLED display technology. The arrangement consists of an OLED light source and a number of photo detectors based on TFTs fabricated on a common substrate, and a joystick having a reflector, hung above the substrate.

This arrangement can be used in devices such as mobile phones, PDAs and other handheld devices to navigate through the menus on the display. The FIG. 10 right side shows the combined display-joystick in a mobile phone, for example. The body of joystick and its suspension mechanism can be built on the display substrate (see FIG. 10, bottom-left), or can be a part of the top cover of the phone.

It is to be understood that the above description is included to illustrate the operation of the preferred embodiments and is not meant to limit the scope of the invention. From the above discussion, many variations will be apparent to one skilled in the art that would yet be encompassed by the spirit an scope of the present invention.

The invention claimed is:

1. An optical pointing device comprising a base and an actuator movable to the base, wherein the actuator comprises a reflective portion on a side facing the base, and wherein the base comprises:
    a light source for emitting light towards the reflective portion of the actuator,
    a detector comprising one or more detection units for detecting at least a part of the light reflected by the reflective portion of the actuator,
    a transparent element arranged between the actuator and at least one of the light source and the one or more detection units, for providing a closed transparent housing for the light source and/or the one or more detection units,
    means to prevent or compensate for detection of a background light originating from a non-movable constituent of the pointing device, in particular originating from a part of said base, in particular from the transparent element, wherein the sensitivity and/or threshold of the one or more detection units is arranged to be substantially proportional to an irradiance profile of the background light, and
    a detection circuit, wherein said detection circuit is arranged to provide a different threshold for different detection units to compensate for the background light.

2. The pointing device according to claim 1, wherein the transparent element comprises a transparent material and wherein the light source and/or the one or more detection units are moulded in the transparent material.

3. The pointing device according to claim 1, wherein a surface of the transparent material between the actuator and the light source and/or the detection units, is substantially flat.

4. The pointing device according to claim 1, wherein the background light comprises reflected light originating from the transparent element, in particular total internal reflected light originating from the transparent element.

5. The pointing device according to claim 1, wherein the one or more detection units are placed in an area substantially outside a zone illuminated by the background light.

6. The pointing device according to claim 1, wherein the different detection units are provided with different photosensitive areas.

7. The pointing device according to claim 6, wherein the photosensitive area of a first detection unit arranged at a first location with a high background irradiance is smaller than the photosensitive area of a second detection unit arranged at a second location with less background irradiance, in particular wherein the photosensitive areas of the first and second detection unit are arranged to provide substantially the same threshold for the first and second detection unit.

8. The pointing device according to claim 1, wherein the light source and/or the base comprise means for limiting the angular distribution of the emitted light substantially within an angle for total reflection at the transparent element, in particular a critical angle for total internal reflected light from the transparent element.

9. Use of the optical pointing device according to claim 1, for sensing a pointing action indicated by a user, wherein said use comprises the steps of:
    emitting light towards the reflective portion of the actuator,
    detecting at least part of the light reflected by the reflective portion of the actuator, and
    processing said detection light to sense the pointing action.

10. A pointing device comprising a base and an actuator movable connected to the base, which base comprises:
    a light source for illuminating the actuator,
    a detector comprising one or more detection units for detecting light reflected by the actuator,
    means to prevent or compensate for detection of a substantially constant background light originating from a non-movable constituent of the pointing device, wherein the sensitivity and/or threshold of the one or more detection units is arranged to be substantially proportional to an irradiance profile of the background light, and
    a detection circuit, wherein said detection circuit is arranged to provide a different threshold for different detection units to compensate for the background light.

11. A base unit for an optical pointing device according to claim 1, wherein said base unit comprises:
    a light source for emitting light,
    a detector comprising one or more detection units, which are placed juxtaposed to said light source, and wherein said light source is arranged to direct said emitted light in a direction away from said detection units, and
    a transparent element for providing a closed transparent housing for the light source and/or the one or more detection units.

12. A method of calibration of the base unit according to claim 11 or the optical pointing device according to claim 1, wherein said method comprises the steps of:
    emitting light from said light source, and prevent that said light is reflected by said reflective portion of said actuator, for example when the reflective portion is not in place or by placing a non-reflective element in front of said reflective portion,
    readout said detector to determine the irradiance of the detection units due to the background light.

13. The pointing device of claim 10, wherein the different detection units are provided with different photosensitive areas.

14. The pointing device of claim 13, wherein the photosensitive area of a first detection unit arranged at a first location with a high background irradiance is smaller than the photosensitive area of a second detection unit arranged at a second location with less background irradiance, in particular wherein the photosensitive areas of the first and second detection unit are arranged to provide substantially the same threshold for the first and second detection unit.

15. A pointing device comprising a base and an actuator movable connected to the base, which base comprises:
- a light source for illuminating the actuator,
- a detector comprising one or more detection units for detecting light reflected by the actuator, and
- means to prevent or compensate for detection of a substantially constant background light originating from a non-movable constituent of the pointing device, wherein the sensitivity and/or threshold of the one or more detection units is arranged to be substantially proportional to an irradiance profile of the background light, wherein the different detection units are provided with different photosensitive areas, wherein the photosensitive area of a first detection unit arranged at a first location with a high background irradiance is smaller than the photosensitive area of a second detection unit arranged at a second location with less background irradiance, in particular wherein the photosensitive areas of the first and second detection unit are arranged to provide substantially the same threshold for the first and second detection unit.

16. The pointing device according to claim 15, wherein the transparent element comprises a transparent material and wherein the light source and/or the one or more detection units are molded in the transparent material.

17. The pointing device according to claim 15, wherein a surface of the transparent material between the actuator and the light source and/or the detection units, is substantially flat.

18. The pointing device according to claim 15, wherein the background light comprises reflected light originating from the transparent element, in particular total internal reflected light originating from the transparent element.

19. The pointing device according to claim 15, wherein the one or more detection units are placed in an area substantially outside a zone illuminated by the background light.

20. The pointing device according to claim 15, wherein the light source and/or the base comprise means for limiting the angular distribution of the emitted light substantially within an angle for total reflection at the transparent element, in particular a critical angle for total internal reflected light from the transparent element.

* * * * *